United States Patent
Lopez Pinana

(10) Patent No.: US 10,189,374 B2
(45) Date of Patent: Jan. 29, 2019

(54) SYSTEM FOR FOLDING SEATS IN A VEHICLE

(71) Applicant: Jaguar Land Rover Limited, Coventry (GB)

(72) Inventor: Jose Lopez Pinana, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 8 days.

(21) Appl. No.: 15/326,384

(22) PCT Filed: Jul. 21, 2015

(86) PCT No.: PCT/EP2015/066616
§ 371 (c)(1),
(2) Date: Jan. 13, 2017

(87) PCT Pub. No.: WO2016/020185
PCT Pub. Date: Feb. 11, 2016

(65) Prior Publication Data
US 2017/0197522 A1 Jul. 13, 2017

(30) Foreign Application Priority Data
Aug. 8, 2014 (GB) .................. 1414072.7

(51) Int. Cl.
*B60N 2/30* (2006.01)
*B60N 2/00* (2006.01)
(Continued)

(52) U.S. Cl.
CPC ............... *B60N 2/01* (2013.01); *B60N 2/002* (2013.01); *B60N 2/0232* (2013.01);
(Continued)

(58) Field of Classification Search
CPC .......... B60N 2/01; B60N 2/806; B60N 2/919; B60N 2/0232; B60N 2/0244; B60N 2/442; B60N 2/4805
See application file for complete search history.

(56) References Cited

U.S. PATENT DOCUMENTS 4,669,780 A 6/1987 Sakakibara et al.
4,977,973 A * 12/1990 Takizawa ............... B60N 2/874
180/271

(Continued)

FOREIGN PATENT DOCUMENTS

DE 199 16 811 C1 5/2000
DE 102 29 599 A1 1/2004
(Continued)

OTHER PUBLICATIONS

Combined Search and Examination Report, GB Application No. 1414072.7 dated Feb. 2, 2015, 6 pages.
(Continued)

*Primary Examiner* — Behrang Badii
*Assistant Examiner* — Daniel L Greene
(74) *Attorney, Agent, or Firm* — Myers Bigel, P.A.

(57) ABSTRACT

A system for changing rear seat positions in a vehicle between deployed and folded configurations. The system comprises means to effect the steps of initiating a movement of the rear seating and, after initiation, moving the front seat so that collision between the seating is avoided. The front seat is returned to its previous position, or as near as possible thereto, afterwards. The system includes means to detect the position of the seating and to calculate whether a collision will occur, and automatically to effect the requisite movements of the front seating to avoid the collision.

15 Claims, 5 Drawing Sheets

(51) Int. Cl.
  *B60N 2/01* (2006.01)
  *B60N 2/835* (2018.01)
  *B60N 2/02* (2006.01)
  *B60N 2/06* (2006.01)
  *B60N 2/20* (2006.01)
  *B60N 2/22* (2006.01)
  *B60N 2/36* (2006.01)
  *B60N 2/806* (2018.01)
  *B60N 2/90* (2018.01)

(52) U.S. Cl.
  CPC ......... *B60N 2/0244* (2013.01); *B60N 2/0252* (2013.01); *B60N 2/06* (2013.01); *B60N 2/20* (2013.01); *B60N 2/22* (2013.01); *B60N 2/3011* (2013.01); *B60N 2/36* (2013.01); *B60N 2/806* (2018.02); *B60N 2/835* (2018.02); *B60N 2/919* (2018.02); *B60N 2002/0268* (2013.01); *B60N 2002/948* (2018.02)

(56) References Cited

U.S. PATENT DOCUMENTS

| | | | | |
|---|---|---|---|---|
| 6,135,561 | A * | 10/2000 | Kruger | B60R 22/185 297/408 |
| 7,640,090 | B2 * | 12/2009 | Uchida | B60N 2/002 701/49 |
| 7,967,377 | B2 * | 6/2011 | Truckenbrodt | B60N 2/002 297/217.3 |
| 2004/0129478 | A1 * | 7/2004 | Breed | B60N 2/002 180/273 |
| 2004/0140783 | A1 | 7/2004 | Fukuhara et al. | |
| 2006/0208169 | A1 * | 9/2006 | Breed | B60N 2/002 250/221 |
| 2015/0342352 | A1 * | 12/2015 | Fischer | A47C 1/036 297/61 |

FOREIGN PATENT DOCUMENTS

| | | |
|---|---|---|
| DE | 10 2004 038 320 A1 | 3/2006 |
| EP | 2 287 036 A2 | 2/2011 |
| JP | 2005-119496 A | 5/2005 |
| JP | 2009-035093 A | 2/2009 |
| WO | WO 2005/049371 A2 | 6/2005 |

OTHER PUBLICATIONS

Combined Search and Examination Report, GB Application No. 1512795.4, dated Jan. 6, 2016, 6 pages.

Notification of Transmittal of the International Search Report and the Written Opinion of the International Searching Authority, or the Declaration, PCT/EP2015/066616, dated Sep. 23, 2015, 12 pages.

* cited by examiner

SYSTEM FOR FOLDING SEATS IN A VEHICLE

RELATED APPLICATIONS

This application is a 35 U.S.C. § 371 national stage application of PCT Application No. PCT/EP2015/066616, filed on Jul. 21, 2015, which claims priority from Great Britain Patent Application No. 1414072.7 filed on Aug. 8, 2014, the contents of which are incorporated herein by reference in their entireties. The above-referenced PCT International Application was published in the English language as International Publication No. WO 2016/020185 A1 on Feb. 11, 2016.

TECHNICAL FIELD

The present disclosure relates to a system for folding seats in a vehicle and particularly, but not exclusively, to systems for folding rear seats in motor vehicles to increase the cargo space in the rear of the vehicle.

BACKGROUND

It is known for motor vehicles to allow a user to fold some of the seats to increase the space available for cargo. In particular, the rear seating of motor vehicles often comprises a backrest portion and a bottom portion, the backrest portion being pivotably mounted relative to the seat portion so that the seat can be moved continuously between a deployed configuration, in which a user can comfortably sit on the seat portion with their backs leaning against the backrest portion of the seat, and a folded configuration where the backrest portion is folded substantially contiguous with seat portions whereby the space available for cargo is increased. In the deployed configuration a large angle, typically an obtuse angle, is formed between the backrest portion and the seat portion, and in the folded configuration either an acute angle is formed between the backrest portion and the seat portion or the backrest portion is substantially parallel to the seat portion.

As the rear seating is moved between the deployed configuration and the folded configuration there is a possibility that the backrest portion will collide with front seating of the vehicle, so that the user is required to move the front seating to a position outside the range of motion of the rear seating before completing the movement of the rear seating, which is inconvenient and time consuming.

The present invention aims to at least partially mitigate the disadvantages described above.

SUMMARY OF THE INVENTION

In an aspect for which protection is sought the present invention provides a system for changing the position of seats in a vehicle having forward seating and rearward seating, said rearward seating comprising at least one seat having a deployed configuration and a folded configuration, the system comprising:
   a control unit;
   a memory device;
   a sensor for detecting the position of the forward seating; and
   an input device for initiating a movement of said rearward seating between said deployed or folded configurations to the other of said deployed and folded configurations, wherein the control unit, after said initiation, is configured:
   to detect the position of said forward seating by reference to the sensor;
   to store said detected position in the memory device;
   when part of the forward seating lies within a first volume defined by the integral of all of the positions that any part of the rearward seating may occupy as said rearward seating travels between said deployed configuration and said folded configuration, to control movement of said forward seating to a first safe position, in which safe position no part of the forward seating lies within said first volume;
   to control movement of the rearward seating between said configurations; and,
   when moving said forward seating back to said detected position would not cause it to collide with said rearward seating, to control movement of the forward seating back into said detected position.

According to another aspect of the present invention for which protection is sought there is provided a system for changing the position of seats in a vehicle having at least one front seat and at least one rear seat, said rear seat having a deployed configuration and a folded configuration, the system comprising:
   a control unit configured, on detection of movement of said rear seat between said deployed and folded configurations, to:
   detect the position of said front seat;
   control movement of said front seat to a first position in which no part of the front seat lies within a first volume that any part of the rear seat may occupy in or between said deployed and folded configurations; and
   control movement of the front seat back into said detected position if such movement would not cause it to touch, collide or otherwise interfere with said rear seat.

When moving the forward seating back to the detected position would cause it to collide with the rearward seating, said control unit may be configured to control movement of the forward seating to a second safe position as close to said detected position as possible.

Optionally, each of said forward seating and said rearward seating may comprise a plurality of seats.

The detecting of the position of said forward seating may be by reference to the memory device and a stored position of the last movement of said forward seating.

In some embodiments, the system may comprise a detector to check whether at least said rearward seating is occupied by a user, the control unit being configured to effect movement of the vehicle seating only when said rearward seating is not occupied.

In an embodiment said rearward seating may further comprise at least one extendable headrest, and the first volume is calculated based on the assumption that the headrest is fully extended.

In another embodiment, said rearward seating may further comprise at least one extendable and retractable headrest and, when the system is employed to move the rearward seating to said folded configuration, the control unit is configured to effect movement of said headrest to a retracted position, and to calculate the first volume based on said retracted position of the headrest.

After actuation of the input device and when the rearward seating is in its deployed configuration, the position of the headrest in said deployed configuration of the rearward seating may be stored in the memory device, the headrest being restored to its position stored in the memory device on return of the rearward seating to said deployed configuration.

In some embodiments, the control unit may be configured to perform at least a first portion of the movement of the rearward seating between said configurations simultaneously with the movement of the forward seating.

In this event, the control unit may be configured to:
i. check whether the forward seating is within said first volume when said first portion of the movement is completed; and
ii. when the forward seating is not in the first volume when the first portion of the movement is completed, continue with the movement of the rearward seating; or
iii. when the forward seating is in the first volume when the first portion of the movement is completed, wait for the forward seating to exit the first volume before continuing with the movement of the rearward seating.

In an embodiment, the control unit may be configured so that said movement of said headrest to the retracted position is performed simultaneously with said first portion of the movement of the rearward seating.

Thus a user wishing to stow a large load in a vehicle may open a rear door of the vehicle and only then decide that the rearward seats of the vehicle should be folded flat. The input device can at least comprise a switch accessible from the rear door which operates the seats by releasing latches that retain the seats in position, commencing folding the rearward seat whilst at the same time storing the current position of the forward seats and moving them forwardly out of the way of the rearward seats. The head rests on the rearward seat might be retracted with their current position being also stored in the memory of the control system. When the forward seats are adequately removed from the path of the rearward seats, the rearward seats continue their movement until they reach their flat folded position in which the cargo hold is at a maximum. Then, the control system moves the forward seats back to their previous position or, if there is not enough room to such a rearward position, to move them back as far as they can. When the operation is reversed, the last movement might be of the headrests on the rearward seats being returned to their stored position. The system includes detectors, for example in the event of unexpected resistance to movement. Also, the subsequent actuation of any switch of the vehicle can be regarded and accepted by the control system as an emergency stop instruction.

The control unit and memory device may be integrated in a seat memory module. The system may comprise two seat memory modules, one to control forward seating and another to control rearward seating, each communicating with the other to know at any time their positions and control their movements. Where there are four seats, two forming the forward seating and two forming the rearward seating. The system may comprise four seat memory modules.

Where the system detects that part of the forward seating lies within a first volume defined by the integral of all of the positions that any part of the rearward seating may occupy as said rearward seating travels between said deployed configuration and said folded configuration, this may be achieved simply by reference to lookup tables or the like which dictate that in a current position a seat needs to move if another seat indicates a desired change in position. What is important is the effect that is achieved, rather than the precise mechanism by which it is achieved. In that respect, the system does not need to have integrating capability.

To detect the position of the seats, preferably there are two sensors in the forward seat to detect slide and recline axes of the forward seat and two sensors in the rearward seat to detect recline and headrest axes.

The forward and rearward seating may each have their own input switches, located in the respective seat, to effect single adjustments to the individual seat. However, said input device for initiating a movement of said rearward seating between said deployed or folded configurations to the other of said deployed and folded configurations may be located in a load space area at the back of the vehicle behind the rearward seating.

Thus when said input device is operated, the rearward seat memory modules may communicate with the forward seat memory modules In another aspect for which protection is sought the invention provides a method of changing the position of seats in a vehicle having forward seating and rearward seating said rearward seating comprising at least one seat having a deployed configuration and a folded configuration, the method comprising:
  receiving an input indicative of initiation of a movement of said rearward seating between said deployed and folded configurations;
  receiving an input indicative of the position of said forward seating;
  controlling movement of said forward seating to a first safe position in which no part of the forward seating lies within a first volume defined by the integral of all of the positions that any part of the rearward seating may occupy between said deployed and folded configurations; and
  controlling movement of the forward seating back into said detected position if such movement would not cause it to collide with said rearward seating.

Optionally, the method may further comprise controlling movement of said rearward seating between said deployed and folded configurations. Further optionally, the movement of said rearward seating between said deployed and folded configurations may be performed simultaneously with at least a portion of the movement of said forward seating to a first safe position in which no part of the forward seating lies within a first volume defined by the integral of all of the positions that any part of the rearward seating may occupy between said deployed and folded configurations.

In another aspect the invention may provide a controller configured to implement provides a method of changing the position of seats in a vehicle as described above.

In another aspect for which protection is sought the invention provides a controller for changing the position of at least one forward seat in a vehicle having forward seating comprising at least one forward seat and rearward seating comprising at least one rearward seat having a deployed configuration and a folded configuration, the control unit being configured to:
  receive of an input indicating that a movement of said rearward seating between a deployed configuration and a folded configuration has been initiated;
  receive an input indicative of the position of said forward seating;
  control movement of said forward seating to a first safe position in which no part of the forward seating lies within a first volume defined by the integral of all of the positions that any part of the rearward seating may occupy between said deployed and folded configurations; and
  control movement of the forward seating back into said detected position if such movement would not cause it to collide with said rearward seating.

Optionally, the controller may be configured to change the position of said rearward seat, the controller being configured, upon receipt of said input indicating that a movement of said rearward seating between a deployed configuration and a folded configuration has been initiated, to control movement of said rearward seating between said deployed configuration and said folded configuration. Further optionally the controller may be configured to control the movement of said rearward seating between said deployed configuration and said folded configuration to occur simultaneously with at least a portion of said movement of said forward seating to a first safe position in which no part of the forward seating lies within a first volume defined by the integral of all of the positions that any part of the rearward seating may occupy between said deployed and folded configurations.

It will be understood that the controller may comprise a processor and electronic memory having instructions stored thereon. Furthermore, the controller may in fact comprise a plurality of controllers in communication with one another.

According to another aspect for which protection is sought the invention provides a seating arrangement for a vehicle comprising forward seating, rearward seating, and at least one of a system as described above and a controller as described above.

In another aspect for which protection is sought the invention provides a motor vehicle including a system as described above.

The terms "forward" or "front" seat or seating and "rearward" or "rear" seat or seating are used herein to refer to seating rows, or to individual seats within such rows, relative to their position within the vehicle. In many vehicles, these equate to front seats and rear seats of a vehicle incorporating two rows of seating, which is typical in many vehicles. However, the invention applies equally to vehicles in which there are more than two rows of seats, wherein the rearward seating and the forward seating of the present invention may refer to any two pairs of adjacent rows of seating, depending on the vehicle in question. In particular, the terms "forward" and "rearward" are not intended to refer to the direction in which the respective seat faces within the vehicle, unless otherwise indicated.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
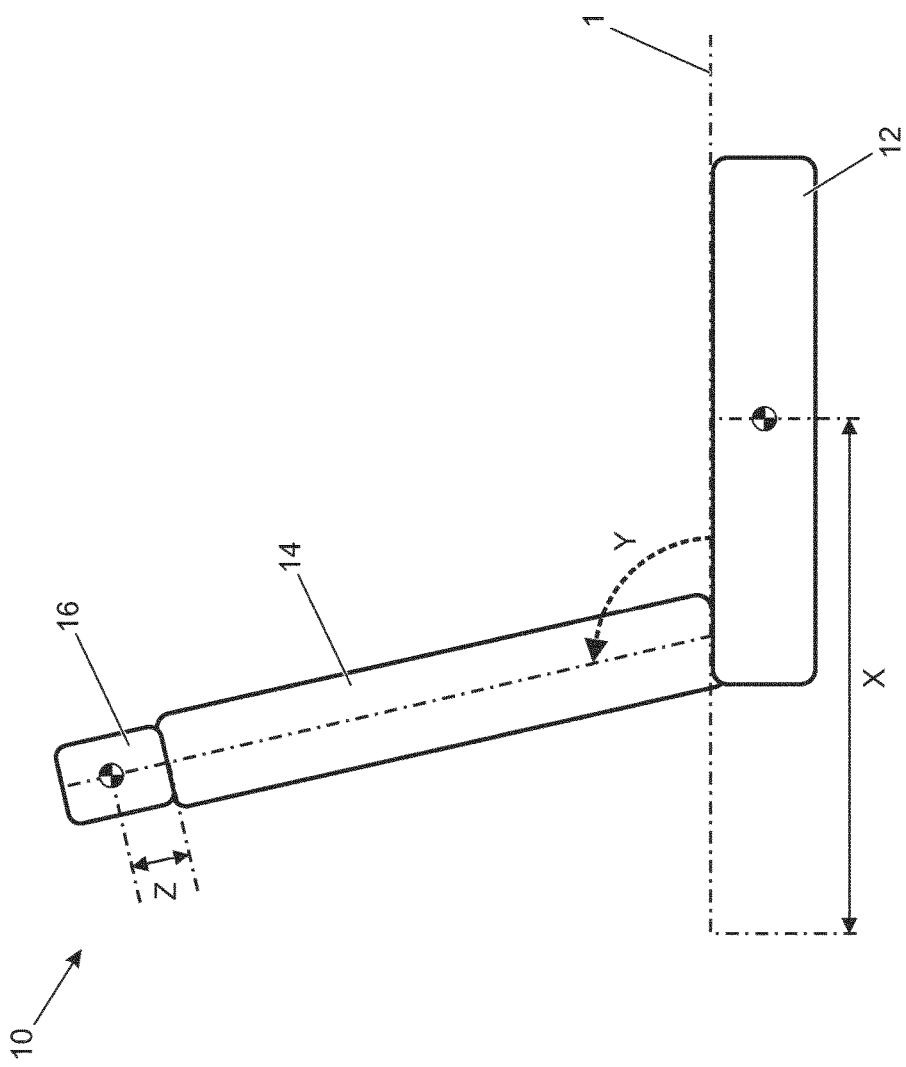
FIG. 1 is an illustration of the degrees of freedom of a typical seat fitted in a motor vehicle (PRIOR ART)

FIG. 1 shows a seat 10 as typically fitted to motor vehicles, the seat being typically movable in three separate degrees of freedom. The position X of the entire seat 10 along axis 1, the angle Y formed between backrest portion 14 and seat portion 12 and the position of headrest 16 relative to backrest 14 are all independently variable. Axis 1 may be called the slide axis, and position X the slide position. The angle Y may be called the recline angle, and position Z is typically called the headrest position. These naming conventions will be adhered to herein. It should be understood that adjustment of the Y and Z positions are optional and that adjustment of any of the positions need not be linear or even simple movements having only one degree of freedom.

In prior art vehicles the slide position X and the recline angle Y may be manually adjustable or driven, using either electrical or mechanical actuation means. Headrest position Z is typically manually adjustable. Furthermore, some prior art vehicles allow the height of either or both of the front and rear seating to be adjusted, by moving the seating along an axis perpendicular to axis 1.

Figure 2:
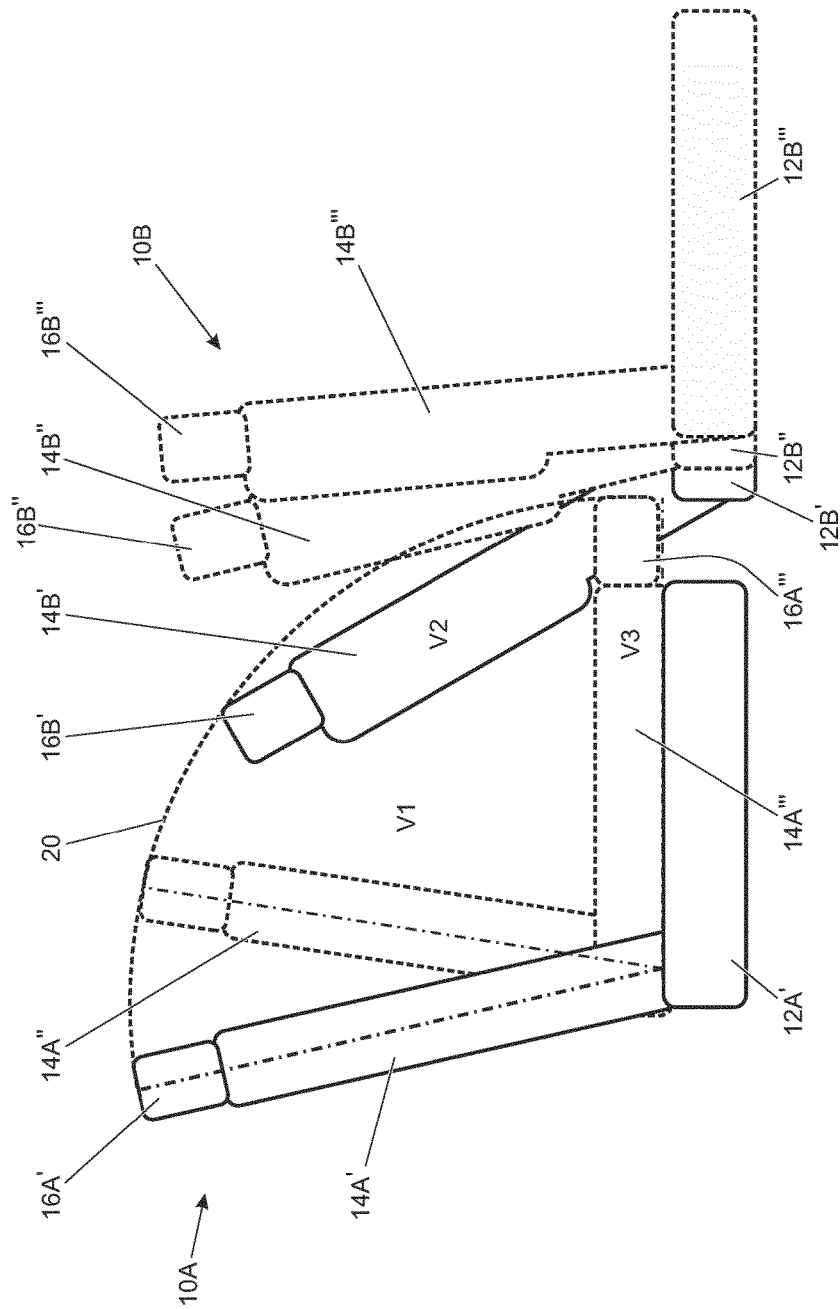
FIG. 2 shows various possible positions of a front seat and a rear seat.

FIG. 2 shows front seating 10B and rear seating 10A, which may be, respectively, the front and rear seats of a motor vehicle. Each of front seating 10B and rear seating 10A comprises a seat portion 12 and a backrest portion 14. In the embodiment illustrated in FIG. 2 front seating 10B is movable along a slide axis 1, whilst rear seating 10A is fixed along slide axis 1. Recline angle Y and, potentially, the headrest position Z are adjustable on both of front seating 10B and rear seating 10A.

If a user of the motor vehicle wishes to increase the cargo storage capacity of the vehicle then they may wish to move rear seating 10 into a folded configuration, in which backrest portion 14A is substantially parallel to seat portion 12, as illustrated by backrest 14A'''.

Using prior art methods to fold rear seat 10A it is necessary for the user to manually move front seat 10B to a position outside the path of the outermost portion of backrest portion 14A, indicated by arc 20, before moving the rear seat into its folded configuration. The present invention provides a method for folding rear seats 10A that obviates the need for the user to manually move the front seats 10B before folding rear seats 10A.

The present invention provides a method and a system for automatically adjusting the positions of seats in which a single user input is sufficient to move the rear seating from a folded configuration to a deployed configuration and vice versa.

Figure 4:
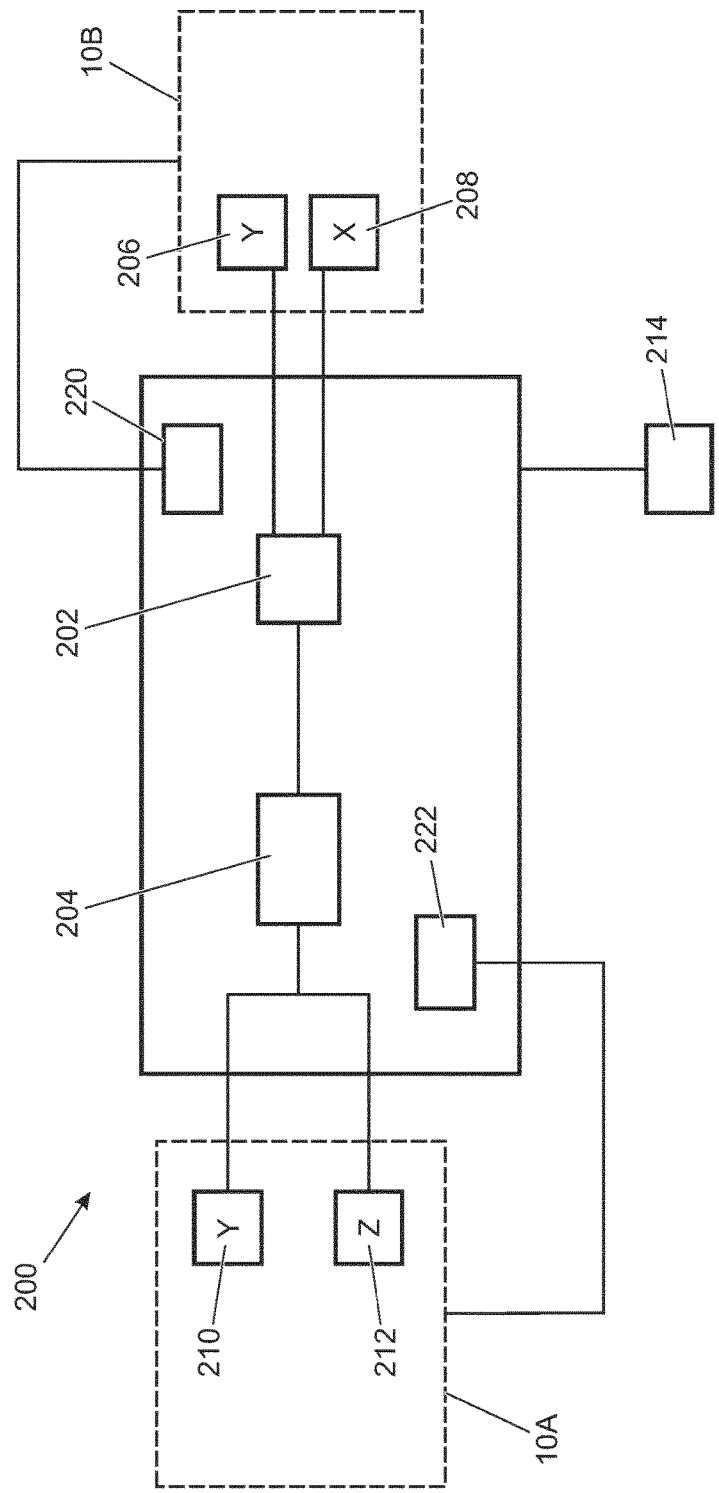
FIG. 4 shows a control unit for controlling the folding of seats in an embodiment of the present invention.

With reference to FIG. 4, a system in accordance with the invention is illustrated and includes a control unit 200 comprising first and second sensors 206, 208 which are configured to detect, respectively, the recline (Y) and slide (X) positions of front seating 10B. Third and fourth sensors 210,212 are also provided and configured to detect, respectively, the recline (Y) and headrest (Z) positions of rear seating 10A. The control unit further comprises a first actuator 220 configured to control at least one of the recline Y and the slide X positions (and preferably both) of the front seating 10B, and a second actuator 222 configured to control the recline Y and, optionally, the headrest Z, positions of rear seating 10A. A first memory device 202 may record current positions of any of the seating.

The control system 200 further comprises a user input 214. User input 214 may comprise a switch, a voice command, or a function in the vehicle's infotainment system. It may comprise a switch accessible from the rear of the vehicle, since users frequently determine that an increase in cargo space is necessary only after they have begun loading.

Figure 3:
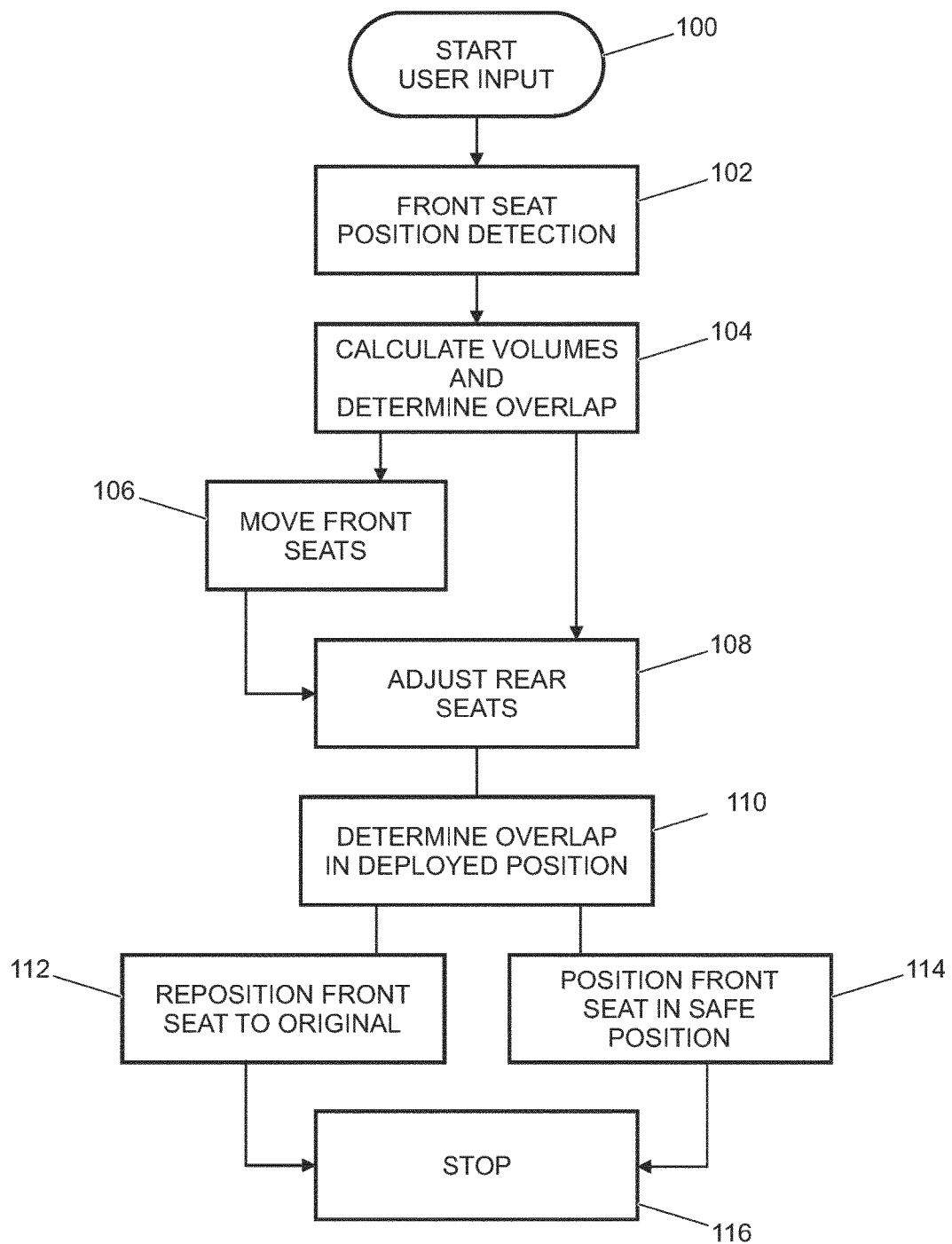
FIG. 3 shows a block diagram indicating the operation of a method for folding seats in an embodiment of the present invention.

FIG. 3 shows a block diagram illustrating the operation of the control system shown in FIG. 4 to change the position of seats in a vehicle. At step 100 the control unit 200 receives a user input (through input 214) indicating that a user wishes to move the rear seating 10A to either a deployed position or a folded position.

Firstly, the control system may check that the rear seating is not occupied before proceeding further. If this functionality is provided, a further sensor (not shown) is required). In some embodiments the control system may also check that the front seating is not occupied before proceeding. Again, a further sensor may be required for this functionality. Alternatively, the vehicle's infotainment may provide a warning if a user input is received from input 214 and the warning may offer a user occupying the front seating the opportunity to override the user input 214 and prevent the system from proceeding to the next step, 102.

In step 102 the position of recline and slide of front seating 10B are detected by recline sensor 206 and slide sensor 208, and stored in the first memory device 202.

Optionally, the system may include said additional sensor 212 configured to detect the headrest position Z of the headrest 16A on the rear seating, which, when present, is activated at this stage, and its position is also stored in the first memory device 202.

Next, the system moves on to step 104, in which a first volume V1, corresponding to the integral of all of the positions occupied by all parts of rear seating 10A, is calculated. If the headrest position 16A was detected in step 102 then the first volume V1 may be calculated using the detected position of headrest 16A. If the position of headrest 16A was not detected then the first volume is calculated based on the assumption that headrest 16A is fully extended (i.e. the value of Z is the maximum permitted). Finally, if the headrest includes means to retract the headrest, and that means is initiated in step 102, first volume V1 may be calculated using the retracted position of headrest 16A.

Incidentally, whether it is actually "volume" in units of volume that is calculated, or merely arcs or lines of movement from which a swept volume could be calculated, is not relevant or indeed essential. The skilled person understands what is required from the foregoing.

The control system also calculates a second volume V2, corresponding to the space currently occupied by front seating 10B based on the recline and slide of front seating 10B. Having calculated the first and second volumes the control system determines whether any part of the first volume overlaps the second volume. If the first volume does partially overlap the second volume the control system moves on to step 106, and if the first volume does not overlap the second volume then the control system moves on to step 108.

Referring to FIG. 2, in step 104 of FIG. 3, if the second volume V2 corresponds to the space occupied by the front seating 10B when the backrest, seat portion and headrest thereof are in the positions indicated as either 14B', 12B' and 16B', or 14B", 12B" and 16B" then there is overlap between the first volume V1 and the second volume, and the control system moves on to step 106. However, if the second volume corresponds to the space occupied by the front seating 10B when the backrest, seat portion and headrest thereof are in the positions indicated as 14B''', 12B''' and 16B''' then there is no overlap between the first and second volumes, so the control unit moves directly to step 108 in FIG. 3.

In step 106 the control system is configured to move the front seating 10B so that no part of the front seating lies within the first volume V1 using the second actuator. This may be achieved by adjusting one or both of the slide and the recline of the front seating. In one embodiment the first actuator only controls the slide of the front seating. Depending upon the separation between the front and the rear seating and the allowed recline of the front seating, adjustment of the slide may be sufficient to move the front seating out of the first volume even when the recline of the front seating is at its maximum value. In this case it is only necessary to provide one actuator configured to move the front seating.

When the front seating is outside the first volume (either after having been moved in step 106 or because it was already there in step 104) the controller moves on to step 108, in which the recline of the rear seating 10A is adjusted to move the rear seating from its current configuration into either the folded or deployed configuration, in accordance with the user's input signal provided in step 100.

Once the movement of the rear seating into the deployed or folded configuration is complete the controller moves on to step 110, in which a third volume V3, corresponding to the space currently occupied by the rear seating is calculated, and the control system determines whether any part of the third volume overlaps the second volume V2 calculated in step 104 and stored in first memory device 202. The second volume may be recalculated at this stage based on the recorded recline and slide of the front seating that was recorded in step 102, or the second volume may have been recorded in the first memory device in step 104 to avoid recalculation at this stage. Indeed, the skilled person will understand that recline and slide of the front seating is equivalent to recording the second volume, as the second volume may be easily calculated from the recline and slide positions of the front seating. In any event, if the third volume is found not to overlap the second volume then the control unit moves on to step 112, in which the front seating is moved back to the configuration detected in step 102. If the third volume V3 closely approaches the second volume V2, then the control unit moves on to step 114, in which the front seating is moved to a safe configuration outside the third volume V3 and which avoids collision with the rear seating.

A "safe" configuration is calculated to ensure that collision between the front seating and the rear seating is not possible when the rear seating is in either the folded configuration or the deployed configuration, although the skilled person will understand that such collision is relatively unlikely when the rear seating is in the deployed configuration. The object of the safe configuration is to provide a user wishing to use the front seating with a seating configuration which is as close as possible to the configuration detected in step 102, without colliding with the rear seating. Accordingly, the safe configuration may move the front seating so that part of the front seating is close to the third volume, but without actually touching the third volume (which would cause a collision between the front and rear seating).

Referring again to FIG. 2, the safe configuration may correspond to the positioning of front seating 10B in which the backrest portion is located as shown by reference numeral 14B" and the seat portion is located as shown by reference numeral 12B". As shown in FIG. 2, there is a small separation between the front seating 10B and the rear seating when the rear seating is in the folded configuration and the front seating is in the safe configuration. This may be due to uncertainty in the positioning of the headrest 16A'". Accordingly, if the position of headrest 16'" is known, for example because it is fixed or because the control unit is provided with the fourth sensor 212 adapted to detect the position of the headrest 16A, then the separation between the front and rear seating when the front seating is in the safe configuration may be reduced or eliminated.

After either step 114 or 112 the control unit moves on to step 116, in which the seat folding method is ended, and the control unit waits for a further user input.

The control system 200 may further comprise a third actuator configured to adjust the headrest position of the rear seating 10A. In this embodiment the headrest 16A may be moved to a retracted position either before or during the movement of the front seat from the deployed configuration to the folded configuration. The position of the headrest 16A before the seats are folded may be recorded in the first memory device, and it may be returned to its original position when a user subsequently requests the rear seating to be returned to the deployed configuration. Such movement of the headrest 16A may be performed during or after the movement of the backrest portion 14A of the rear seating to the deployed configuration.

In a further embodiment of the present invention, the movements of the front and rear seating may be performed simultaneously. For example, a first, initial, portion of the movement of the rear seating to either the deployed configuration or the folded configuration in step 108 of FIG. 3 may be performed simultaneously with at least a portion of the movement of the front seating in step 106 of FIG. 3, provided that no part of the respective movement volumes coincide contemporaneously. Similarly a second portion of the movement of the rear seating to the deployed or folded configuration may be performed simultaneously with the movement of the front seating to either the safe configuration, as described with reference to step 214 or the configuration detected in step 202, as described with reference to step 212. This embodiment will be described in more detail below, with reference to FIG. 5.

Figure 5:
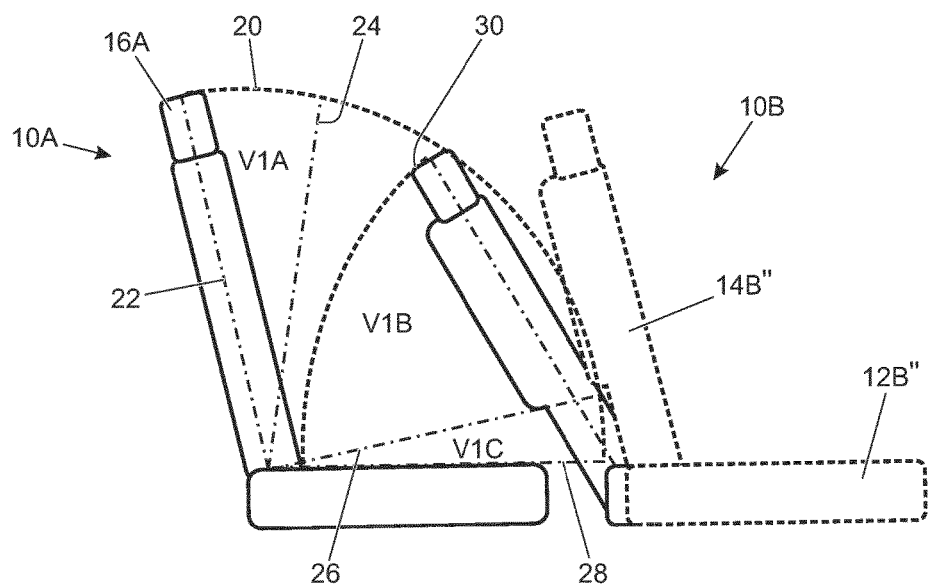
FIG. 5 shows a sequence of movement of front and rear seating in an embodiment of the present invention.

In FIG. 5 the first volume V1 is split into three sub-volumes V1A, V1B and V1C. The first of these sub-volumes, V1A is bounded by lines 22, 24 and 20 and, corresponds to the portion of V1 in which it is impossible for the front and rear seating to collide, because the front seating 10B cannot move outside, that is towards the rear seating beyond, the arc 30. Accordingly, movement of the rear seating 10A within sub-volume V1A when the rear seating is being folded may be performed simultaneously with movement of front seating 10B. Furthermore, if an actuator is provided to move headrest 16A to a retracted position when folding the rear seating, the movement of the headrest 16A may also be performed whilst the rear seating moves within sub-volume V1A.

When the rear seating reaches the end of volume V1A (that is line 24) the control unit may be configured to check whether the front seating is within the first volume V1 before advancing the rear seating into volume V1B.

Similarly, when the rear seating is moved from the folded configuration to the deployed configuration sub-volume V1C represents the region in which the rear seating can move before it would collide with the front seating in its safe position, with the backrest and seat portion in the positions illustrated as 14B" and 12B" respectively. Accordingly, the rear seating may move within sub-volume V1C before checking that the front seating is outside first volume V1, and proceeding to move within volume V1B once the front seating is outside first volume V1. Other embodiments in which the movement of the front and rear seating is at least partially simultaneous are also possible. For example, the first volume may be divided into a large number of sub volumes, and the control system may check that the front seating is not each sub volume immediately before the rear seating enters the sub volume. In this way the movement of both the front and rear seating as each of the steps described in relation to FIG. 3 are executed may be substantially continuous for a large range of initial positions of the front seating.

Within the present specification the "front seating" and "rear seating" may be individual seats, or both of the front and rear seating may be rows of seats. If either of the front and rear seating comprises a row of seats the seats within the row may be movable independently of one another. Accordingly, the sensors and actuators for moving the front and rear seating described herein may each comprise multiple sensors and actuators, with each individual sensor or actuator being connected to one of the seats within front or rear seating. Furthermore, although the present invention has been described with respect to a vehicle having only front and rear seating, the skilled person will understand that it applies equally to a vehicle having additional seating. For example, a multi-person vehicle may have front seating and two rows of rear seating, and the methods and controllers of the present invention are suitable for folding either or both of the two rows of rear seating in such a vehicle.

Although the present invention has been described in relation to embodiments in which only the recline and slide of the front and rear seating is adjusted, the skilled person will understand that adjustment of the height of the front and rear seating may be employed in addition or instead of some or all of the adjustment of the slide or incline of the front or rear seating. For example, under certain circumstances increasing the height of front seating 10B may be sufficient to move it out of first volume V1.

Figure 6:
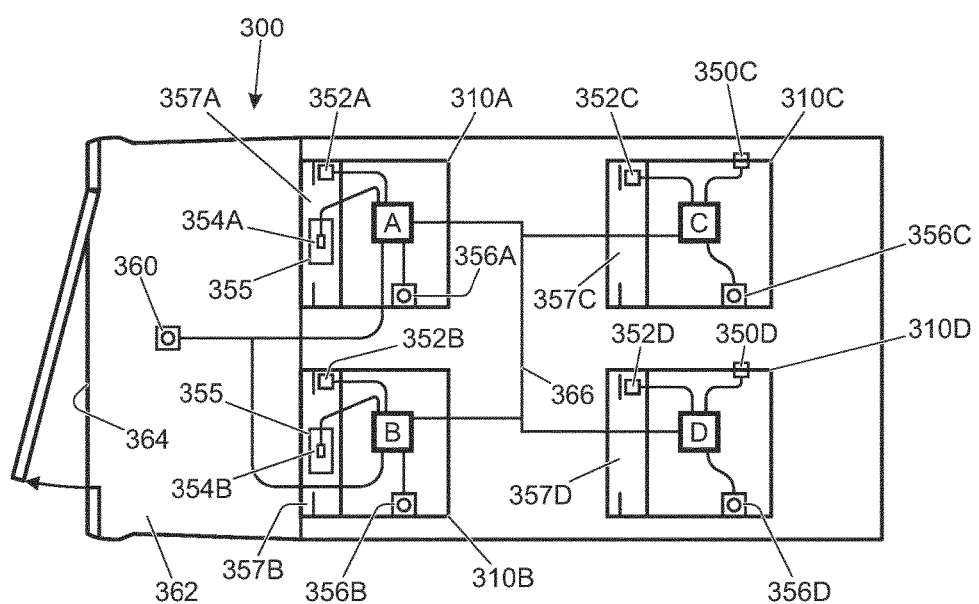
FIG. 6 shows a possible plan view schematic layout of seats in a vehicle.

In a further embodiment, illustrated schematically in FIG. 6, a vehicle 300 has front seating comprising two seats 310C,310D and rear seating comprising two seats 310C, 310D (which may be split asymmetrically). Each seat has its own seat memory module A,B,C and D. Each front seat memory module C,D is connected to a respective position (slide) sensor 350C,D to detect and record back and forth positions of the front seats. Each front seat memory module C,D is also connected to a respective recline sensor 352C,D to detect and record reclined and folded dispositions of the front seats. Each rear seat memory module A,B is connected to a respective headrest sensor 354A,B to detect and record raised and lowered dispositions of headrests 355 of the rear seats 310A,B. Each rear seat memory module A,B is also connected to a respective recline sensor 352A,B to detect and record reclined and folded dispositions of the rear seats 310A,B.

Furthermore, each seat memory module A,B,C,D is connected to a respective input switch 356A-D by which adjustments to the positions of the individual seats may be effected by the respective occupants of the seats. The memory modules are each connected to motors (not shown) that effect at least recline/fold operations of the front and rear seat backs 357A-D, as well as back and forth slide of the front seats. Motors may also effect raising and lowering of the rear headrests 355 under control of the rear seat memory modules A,B. As such, the memory modules also constitute both a memory device and a control unit.

Finally, the rear seats 310A,B each have their memory module A,B connected to an input device 360 located in a rear luggage compartment 362 of the vehicle 300. The input device 360 comprises a switch located where it is accessible to a person from outside of the vehicle through a luggage compartment loading doorway 364 of the vehicle.

Each memory module is interconnected with every other module by an interconnection 366, which may be a CAN bus if this is installed in the vehicle. It may comprise a wireless connection. When input device 360 is actuated, this is either a direct command to "Recline" or "Fold", or it is a simple instruction to change from the current position. In either event, the memory modules A,B determine the current position of the rear seat backs 354A,B. If the command is to fold and the seat backs are already folded, then no action is taken. Likewise if the command is to recline and the seat backs are already reclined. However, if the command requires a change of position, then the module A,B actuates the respective motors to recline/fold the seat backs 357A,B of the rear seats 310A,B. At the same time, the action is copied the front seat modules C,D across link 366 and if the current position (slide and/or recline) of the front seats 310C,D is such that a collision can and will happen during the change in the position of the rear seats, the front seats 310C,D are moved accordingly.

How the modules calculate whether a collision will happen is straightforward and may simply be a matter of recording in the memory of the modules the set of possible front seat dispositions that will or will not cause a collision and comparing the current position with the list. If the current position is not in the list then the front seats are not moved, and vice versa. Alternatively, the arrangements described above may be employed.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

Aspects and embodiments of the invention will be further understood with reference to the following numbered clauses:

1. A system for changing the position of seats in a vehicle having forward seating and rearward seating, said rearward seating comprising at least one seat having a deployed configuration and a folded configuration, the system comprising:
   a control unit;
   a memory device;
   a sensor for detecting the position of the forward seating; and
   an input device for initiating a movement of said rearward seating between said deployed or folded configurations to the other of said deployed and folded configurations,
   wherein the control unit, after said initiation, is configured:
   to detect the position of said forward seating by reference to the sensor;
   to store said detected position in the memory device;
   when part of the forward seating lies within a first volume defined by the integral of all of the positions that any part of the rearward seating may occupy as said rearward seating travels between said deployed configuration and said folded configuration, to control movement of said forward seating to a first safe position, in which safe position no part of the forward seating lies within said first volume;
   to control movement of the rearward seating between said configurations; and,
   when moving said forward seating back to said detected position would not cause it to collide with said rearward seating, to control movement of the forward seating back into said detected position.
2. A system as defined in clause 1, wherein, when moving the forward seating back to the detected position would cause it to collide with the rearward seating, said control unit may be configured to control movement of the forward seating to a second safe position as close to said detected position as possible.
3. A system as defined in clause 1, wherein, wherein each of said forward seating and said rearward seating comprises a plurality of seats.
4. A system as defined in clause 1, wherein, wherein the detecting of the position of said forward seating is by reference to the memory device and a stored position of the last movement of said forward seating.
5. A system as defined in clause 1, wherein, further comprising a detector to check whether at least said rearward seating is occupied by a user, the control unit being configured to effect movement of the vehicle seating only when said rearward seating is not occupied.
6. A system as defined in clause 1, wherein said rearward seating further comprises at least one extendable headrest, and the first volume is calculated based on the assumption that the headrest is fully extended.
7. A system as defined in clause 1, wherein said rearward seating further comprises at least one extendable headrest, and control unit is configured to detect the position of the headrest and calculate the first volume based on said detected position.

8. A system as defined in clause 1, wherein said rearward seating further comprises at least one extendable and retractable headrest and, when the system is employed to move the rearward seating to said folded configuration, the control unit is configured to effect movement of said headrest to a retracted position, and to calculate the first volume based on said retracted position of the headrest.

9. A system as defined in clause 8, wherein, after actuation of the input device and when the rearward seating is in its deployed configuration, the position of the headrest in said deployed configuration of the rearward seating is stored in the memory device, the headrest being restored to its position stored in the memory device on return of the rearward seating to said deployed configuration.

10. A system as defined in clause 1, wherein the control unit is configured to perform at least a first portion of the movement of the rearward seating between said configurations simultaneously with the movement of the forward seating.

11. A system as defined in clause 10, wherein the control unit is configured to:
   i. check whether the forward seating is within said first volume when said first portion of the movement is completed; and
   ii. when the forward seating is not in the first volume when the first portion of the movement is completed, continue with the movement of the rearward seating; or
   iii. when the forward seating is in the first volume when the first portion of the movement is completed, wait for the forward seating to exit the first volume before continuing with the movement of the rearward seating.

12. A system as defined in clause 8, wherein the control unit is configured to:
   i. check whether the forward seating is within said first volume when said first portion of the movement is completed; and
   ii. when the forward seating is not in the first volume when the first portion of the movement is completed, continue with the movement of the rearward seating; and
   iii. when the forward seating is in the first volume when the first portion of the movement is completed, wait for the forward seating to exit the first volume before continuing with the movement of the rearward seating,
wherein the control unit is configured so that said movement of said headrest to the retracted position is performed simultaneously with said first portion of the movement of the rearward seating.

13. A motor vehicle including a control system as defined in clause 1.

The invention claimed is:

1. A system for changing the position of seats in a vehicle having forward seating and rearward seating, said rearward seating comprising at least one seat having a deployed configuration and a folded configuration, the system comprising:
   a control unit configured to, upon initiation of a movement of said rearward seating between said deployed and folded configurations:
   detect a position of said forward seating;
   control movement of said forward seating to a first safe position in which no part of the forward seating lies within a first volume defined by all positions that any part of the rearward seating may occupy between said deployed and folded configurations; and
   control movement of the forward seating back to said detected position if such movement would not cause it to collide with said rearward seating;
   wherein the control unit is configured to cause at least a first portion of the movement of the rearward seating between said configurations to be performed simultaneously with the movement of the forward seating, and wherein the control unit is configured to:
   check whether the forward seating is within said first volume when said first portion of the movement is completed; and
   when the forward seating is in the first volume when the first portion of the movement is completed, wait for the forward seating to exit the first volume before continuing with the movement of the rearward seating.

2. The system of claim 1, wherein, when moving the forward seating back to the detected position would cause it to collide with the rearward seating, said control unit is configured to control movement of the forward seating to a second safe position, said second safe position being a position close to said detected position.

3. The system of claim 1, wherein each of said forward seating and said rearward seating comprises a plurality of seats.

4. The system of claim 1, wherein the control unit detects the position of said forward seating by reference to a memory device and a stored position of a last movement of said forward seating.

5. The system of claim 1, further comprising a detector configured to check whether at least said rearward seating is occupied by a user, and wherein the control unit is configured to effect movement of the vehicle seating only when said rearward seating is not occupied.

6. The system of claim 1, wherein said rearward seating further comprises at least one extendable headrest, and wherein the first volume is calculated assuming that the headrest is fully extended.

7. The system of claim 1, wherein said rearward seating further comprises at least one extendable headrest, and wherein the control unit is configured to detect a position of the headrest and calculate the first volume based on said detected position.

8. The system of claim 1, wherein said rearward seating further comprises at least one extendable and retractable headrest and, when the system is employed to move the rearward seating to said folded configuration, the control unit is configured to effect movement of said headrest to a retracted position, and to calculate the first volume based on said retracted position of the headrest.

9. The system of claim 8, wherein, upon initiation of a movement of said rearward seating when the rearward seating is in its deployed configuration, a position of the headrest in said deployed configuration of the rearward seating is stored in a memory device, the headrest being restored to its position stored in the memory device upon return of the rearward seating to said deployed configuration.

10. The system of claim 8, wherein the control unit is configured so that said movement of said headrest to the retracted position is performed simultaneously with said first portion of the movement of the rearward seating.

11. A controller for changing the position of at least one forward seat in a vehicle having forward seating comprising at least one forward seat, and rearward seating comprising at least one rearward seat and having a deployed configuration and a folded configuration, the controller configured to:
- receive an input indicating that a movement of said rearward seating between a deployed configuration and a folded configuration has been initiated;
- receive an input indicative of a position of said forward seating;
- control movement of said forward seating to a first safe position in which no part of the forward seating lies within a first volume defined by all of the positions that any part of the rearward seating may occupy between said deployed and folded configurations; and
- control movement of the forward seating back into said detected position if such movement would not cause it to collide with said rearward seating;
- wherein the controller is configured to cause at least a first portion of the movement of the rearward seating between said configurations to be performed simultaneously with the movement of the forward seating, and wherein the controller is configured to:
  - check whether the forward seating is within said first volume when said first portion of the movement is completed; and
  - when the forward seating is in the first volume when the first portion of the movement is completed, wait for the forward seating to exit the first volume before continuing with the movement of the rearward seating.

12. A motor vehicle comprising the controller of claim 11.

13. The controller of claim 11, wherein the controller is configured to change a position of said rearward seat, the controller being configured, upon receipt of said input indicating that a movement of said rearward seating between a deployed configuration and a folded configuration has been initiated, to control movement of said rearward seating between said deployed configuration and said folded configuration.

14. The controller of claim 13, wherein the controller is configured to control the movement of said rearward seating between said deployed configuration and said folded configuration to occur simultaneously with at least a portion of said movement of said forward seating to the first safe position in which no part of the forward seating lies within the first volume defined by all of the positions that any part of the rearward seating may occupy between said deployed and folded configurations.

15. A vehicle, comprising:
- forward seating;
- rearward seating comprising at least one seat having a deployed configuration and a folded configuration; and
- a system for changing positions of the forward seating and rearward seating, the system comprising:
  - a control unit configured to, upon initiation of a movement of said rearward seating between said deployed and folded configurations:
    - detect a position of said forward seating;
    - control movement of said forward seating to a first safe position in which no part of the forward seating lies within a first volume defined by all positions that any part of the rearward seating may occupy between said deployed and folded configurations; and
    - control movement of the forward seating back to said detected position if such movement would not cause it to collide with said rearward seating;
    - wherein the control unit is configured to cause at least a first portion of the movement of the rearward seating between said configurations to be performed simultaneously with the movement of the forward seating, and wherein the control unit is configured to:
      - check whether the forward seating is within said first volume when said first portion of the movement is completed; and
      - when the forward seating is in the first volume when the first portion of the movement is completed, wait for the forward seating to exit the first volume before continuing with the movement of the rearward seating.

* * * * *